US009581679B2

United States Patent
Kazmi et al.

(10) Patent No.: US 9,581,679 B2
(45) Date of Patent: Feb. 28, 2017

(54) OBTAINING REFERENCE TIME FOR POSITIONING WHEN CELLS ARE UNKNOWN

(75) Inventors: Muhammad Kazmi, Bromma (SE); Iana Siomina, Solna (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 1311 days.

(21) Appl. No.: 13/512,423

(22) PCT Filed: Dec. 16, 2011

(86) PCT No.: PCT/SE2011/051531
§ 371 (c)(1),
(2), (4) Date: May 29, 2012

(87) PCT Pub. No.: WO2012/108808
PCT Pub. Date: Aug. 16, 2012

(65) Prior Publication Data
US 2013/0017841 A1    Jan. 17, 2013

Related U.S. Application Data

(60) Provisional application No. 61/441,959, filed on Feb. 11, 2011.

(51) Int. Cl.
*H04W 24/00*    (2009.01)
*G01S 5/02*    (2010.01)
(Continued)

(52) U.S. Cl.
CPC ............ *G01S 5/0236* (2013.01); *H04W 8/24* (2013.01); *H04W 24/10* (2013.01); *H04W 64/00* (2013.01)

(58) Field of Classification Search
CPC ....... H04W 4/02; H04W 64/00; H04W 4/028; H04W 4/025
(Continued)

(56) References Cited

U.S. PATENT DOCUMENTS

2010/0253577 A1* 10/2010 Fujiwara ................. H04W 4/02
342/357.42
2010/0323718 A1* 12/2010 Jen ........................ H04W 64/00
455/456.1
(Continued)

OTHER PUBLICATIONS

Ericsson, et al., "E-UTRAN FDD inter-frequency RSTD measurement reporting delay test case", 3GPP TSG-RAN WG4 Meeting #57AH, Jan. 17-21, 2011, pp. 1-6, Austin, USA, R4-110071.
(Continued)

*Primary Examiner* — Omoniyi Obayanju
(74) *Attorney, Agent, or Firm* — Patents on Demand, P.A.; Brian K. Buchheit; Scott M. Garrett

(57) ABSTRACT

Methods and apparatus for determining an assistance data transmission time to account for cell timing acquisition are disclosed. In an example method, a network node determines whether a target wireless communication node (110) will need to obtain timing information for at least one cell to be included in the assistance data. The network node then estimates an acquisition time ΔT for the wireless communication node (110) to obtain timing information for at least a first cell. The network node then transmits the positioning assistance data to the wireless communication node (110) at least ΔT before an expected time for the wireless communication node (110) to begin performing positioning measurements. In some embodiments, the network node is configured to wait for a time period at least equal to an expected reporting delay that accounts for the acquisition time ΔT, before deciding that the positioning has failed.

24 Claims, 6 Drawing Sheets

(51) Int. Cl.
    *H04W 8/24*     (2009.01)
    *H04W 24/10*     (2009.01)
    *H04W 64/00*     (2009.01)

(58) Field of Classification Search
    USPC .......................................... 455/456.1, 456.6
    See application file for complete search history.

(56) References Cited

U.S. PATENT DOCUMENTS

2010/0331009 A1     12/2010   Krishnamurthy et al.
2012/0015667 A1*   1/2012   Woo ...................... G01S 5/0221
                                                                                                 455/456.1

OTHER PUBLICATIONS

ETSI, "LTE; Evolved Universal Terrestrial Radio Access Network (E-UTRAN); Stage 2 functional specification of User Equipment (UE) positioning in E-UTRAN (3GPP TS 36.305 version 9.3.0 Release 9)", ETSI TS 136 305 V9.3.0, Jul. 2010, pp. 1-54, Sophia-Antipolis Cedex, FR.

LG Electronics, "Clarification of SFN acquisition of reference/neighbor cells on OTDOA", 3GPP TSG RAN WG1 #62, Aug. 23-27, 2010, pp. 1-3, Madrid, Spain, R1-104752.

Ericsson, et al., "One cell with known SFN in OTDOA assistance data", 3GPP TSG-RAN2 Meeting #72, Nov. 15-19, 2010, pp. 1-3, Jacksonville, USA, R2-106154.

Ericsson, et al., "Inter-frequency RSTD reporting delay tests", 3GPP TSG-RAN WG4 Meeting #57AH, Jan. 17-21, 2011, pp. 1-2, Austin, USA, R4-110070.

\* cited by examiner

```
ProvideAssistanceData-r9-IEs ::= SEQUENCE {
    commonIEsProvideAssistanceData    CommonIEsProvideAssistanceData    OPTIONAL,    -- Need ON
    a-gnss-ProvideAssistanceData      A-GNSS-ProvideAssistanceData      OPTIONAL,    -- Need ON
    otdoa-ProvideAssistanceData       OTDOA-ProvideAssistanceData       OPTIONAL,    -- Need ON
    epdu-Provide-Assistance-Data      EPDU-Sequence                     OPTIONAL,    -- Need ON
    ...
}
```

*FIG. 2*

```
RequestAssistanceData-r9-IEs ::= SEQUENCE {
    commonIEsRequestAssistanceData    CommonIEsRequestAssistanceData    OPTIONAL,    -- Need ON
    a-gnss-RequestAssistanceData      A-GNSS-RequestAssistanceData      OPTIONAL,    -- Need ON
    otdoa-RequestAssistanceData       OTDOA-RequestAssistanceData       OPTIONAL,    -- Need ON
    epdu-RequestAssistanceData        EPDU-Sequence                     OPTIONAL,    -- Need ON
    ...
}
```

*FIG. 3*

```
OTDOA-ReferenceCellInfo ::= SEQUENCE {
    physCellId          INTEGER (0..503),
    cellGlobalId        ECGI                                            OPTIONAL,   -- Need ON
    earfcnRef           ARFCN-ValueEUTRA                                OPTIONAL,   -- Cond NotSameAsServ0
    antennaPortConfig   ENUMERATED {ports1-or-2, ports4, ... }
    cpLength            ENUMERATED { normal, extended, ... },           OPTIONAL,   -- Cond NotSameAsServ1
    prsInfo             PRS-Info                                        OPTIONAL,   -- Cond PRS
    ...
}
```

FIG. 4

OBTAINING REFERENCE TIME FOR POSITIONING WHEN CELLS ARE UNKNOWN

RELATED APPLICATION

This application claims priority to U.S. Provisional Patent Application Ser. No. 61/441,959, filed 11 Feb. 2011, the entire contents of which are incorporated by reference herein.

TECHNICAL FIELD

The present invention relates to techniques for determining the position of mobile terminals operating in wireless communications networks.

BACKGROUND

The availability of several techniques and devices for identifying the geographical location of mobile device users has enabled a large variety of commercial and non-commercial services, such as navigation assistance, enhanced social networking, location-aware advertising, and location-aware emergency calls. However, different services may have different positioning accuracy requirements imposed by the application. In addition, some regulatory requirements on the positioning accuracy for basic emergency services exist in some countries, such as the FCC's E-911-related requirements in the United States.

In many environments, the position of a mobile device user can be accurately estimated by using positioning methods based on GPS (Global Positioning System) or other satellite-based system. Nowadays, wireless networks are often able to provide positioning-related assistance to mobile terminals (often referred to as user equipment, or UEs, or wireless terminals, mobile stations, or simply "mobiles") to improve the terminal's receiver sensitivity and GPS start-up performance. Several of these techniques are known as Assisted-GPS positioning, or A-GPS.

GPS or A-GPS receivers may not be available in all wireless terminals, however. Furthermore, GPS is known to fail in certain indoor environments and in urban "canyons" in the radio shadows caused by tall buildings. Complementary terrestrial positioning methods, such as one approach called Observed Time-Difference-of-Arrival (OTDOA), have therefore been standardized by the 3rd-Generation Partnership Project (3GPP) and are deployed in various wireless networks. In addition to OTDOA, the 3GPP standards for the so-called Long-Term Evolution (LTE) wireless system also specify methods, procedures and signalling support for techniques called Enhanced Cell ID (E-CID) and Assisted Global Navigation Satellite System (A-GNSS). Later, a network-based technique called Uplink Time-Difference-of-Arrival (UTDOA) may also be standardized for LTE.

Three key network elements for providing location services (LCS) in an LTE positioning architecture include the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e., the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or the network.

The actual position calculation can be conducted by a positioning server (e.g., E-SMLC or SLP in LTE), for example, or by a UE. The former approach is known as the UE-assisted positioning mode, whilst the latter is referred to as the UE-based positioning mode.

Two positioning protocols operating via the radio network are used in LTE: the LTE Positioning Protocol (LPP) and the LTE Positioning Protocol Annex (LPPa). The LPP is a point-to-point protocol between a LCS Server and a LCS target device, used in order to position the target device. LPP can be used both in the user and control plane. Furthermore, multiple LPP procedures are allowed in series and/or in parallel, thereby reducing latency. LPPa is a protocol used between an LTE base station (known as an eNodeB, or eNB, in 3GPP terminology) and an LCS Server, and is specified only for control-plane positioning procedures, although it still can assist user-plane positioning by querying eNodeB's for information and eNodeB measurements.

A third protocol, known as the Secure User Plane Location (SUPL) protocol, is used to transport LPP in the user plane. LPP also provides for the conveyance of LPP extension messages inside LPP messages. For instance, Open Mobile Alliance (OMA) LPP extensions are currently being specified (LPPe) to allow, for example, the transport of operator- or manufacturer-specific assistance data or assistance data that cannot be provided with LPP, or to support other position reporting formats or new positioning methods. LPPe may also be embedded into messages for positioning protocols other than LPP.

A high-level architecture, as currently standardized in LTE, is illustrated in FIG. 1, where the LCS target is a mobile terminal 110, and the LCS Server is an Evolved Serving Mobile Location Center (E-SMLC) 150 or a SUPL Location Platform (SLP) 160. In the figure, three control plane positioning protocols with E-SMLC 160 as the terminating point are shown, and the user plane positioning protocol is shown extending across the bottom of the figure.

An SLP may comprise two components, a SUPL Positioning Centre (SPC) and a SUPL Location Centre (SLC), which may reside in different nodes, in some cases. In an example implementation, SPC has a proprietary interface with E-SMLC, and Llp interface with SLC, and the SLC part of SLP communicates with the P-GW (PDN-Gateway) and an External LCS Client.

Additional positioning architecture elements may also be deployed to further enhance performance of specific positioning methods. For instance, deploying radio beacons is a cost-efficient solution which may significantly improve positioning performance indoors and also outdoors by allowing more accurate positioning.

To meet varying demands for different Location-Based Services (LBS), an LTE network will employ a range of complementary positioning methods characterized by different performance in different environments. Depending on where the measurements are conducted and where the final position is calculated, these methods can be UE-based, UE-assisted or network-based, each with own advantages. The following methods are specified in the LTE standard for both the control plane and the user plane:
  Cell ID (CID);
  UE-assisted and network-based enhanced CID (E-CID), including network-based angle of arrival (AoA);
  UE-based and UE-assisted Assisted Global Navigation Satellite System (A-GNSS), including A-GPS; and
  UE-assisted Observed Time Difference of Arrival (OTDOA).

Several other techniques such as hybrid positioning, fingerprinting positioning and adaptive E-CID (AECID) do not require additional standardization and are therefore also possible with LTE. Furthermore, there may also be UE-based versions of the methods above, e.g., UE-based GNSS (e.g., GPS) or UE-based OTDOA, etc. There may also be some alternative positioning methods such as proximity based location. UTDOA may also be standardized in a later LTE release, since it is currently under discussion in 3GPP. More methods, LTE and non-LTE, are supported with LPPe. Similar methods, which may have different names, also exist for radio-access technologies (RATs) other than LTE, such as CDMA, WCDMA or GSM.

The OTDOA positioning method makes use of the measured timing of downlink signals received from multiple base stations (evolved NodeBs, or eNodeBs, in LTE) at the UE. The UE measures the timing of the received signals using assistance data received from the LCS server, and the resulting measurements are used to locate the UE in relation to the neighboring eNodeBs.

With OTDOA, a terminal measures the timing differences for downlink reference signals received from multiple distinct locations. For each measured neighbor cell, the UE measures a Reference Signal Time Difference (RSTD) which is the relative timing difference between a neighbor cell and the reference cell. The UE position estimate is then found as the intersection of hyperbolas corresponding to the measured RSTDs. At least three measurements from geographically dispersed base stations with a good geometry are needed to solve for three unknowns: two geographic coordinates for the terminal and the receiver clock bias. In addition, in order to solve for the mobile's position, precise knowledge of the transmitter locations and transmit timing offset is needed.

To enable positioning in LTE and to facilitate positioning measurements of a proper quality and for a sufficient number of distinct locations, new physical signals dedicated for positioning (positioning reference signals, or PRS) have been introduced and low-interference positioning sub-frames have been specified in 3GPP. Details are specified in 3GPP TS 36.211; as of February 2011, version 10.0.0 of this specification is available from http://www.3gpp.org.

PRS are transmitted from one antenna port of a base station according to a pre-defined pattern. A frequency shift that is a function of the Physical Cell Identity (PCI) can be applied to the specified PRS patterns to generate orthogonal patterns. The mapping of frequency shifts to PCI models an effective frequency reuse of six, which makes it possible to significantly reduce neighbor cell interference on the measured PRS and thus improve positioning measurements. Even though PRS have been specifically designed for positioning measurements and in general are characterized by better signal quality than other reference signals, the standard does not mandate using PRS. Other reference signals, e.g., cell-specific reference signals (CRS) also could be used for positioning measurements, in principle.

PRS are transmitted in pre-defined positioning sub-frames grouped by several consecutive sub-frames (NPRS), i.e., one positioning occasion. Positioning occasions occur periodically with a certain periodicity of N sub-frames, i.e., the time interval between two positioning occasions. The standardized periods N are 160, 320, 640, and 1280 ms, and the number of consecutive sub-frames may be 1, 2, 4, or 6.

Assistance data transmitted by the network to a mobile terminal is intended to assist the wireless device in its positioning measurements. Different sets of assistance data are typically used for different methods. The positioning assistance data is typically sent by the positioning server, although it may be sent via other nodes. For example, assistance data may be sent via LPP to an eNodeB for transmission to the UE. In this case, the transmission of assistance data may be transparent to the eNodeB and the Mobility Management Entity (MME). The assistance data may also be sent by the eNodeB via LPPa to a positioning server for further transfer to the UE. In some cases, the assistance data may be sent on request from a wireless device that needs to perform measurements. In other cases, the assistance data is sent in an unsolicited way.

In LTE, the assistance data may be requested and provided over LPP protocol by including requestAssistanceData and provideAssistanceData elements in the LPP message, respectively. The current LTE standard specifies the following structure for provideAssistanceData, which is illustrated in FIG. 2, where the commonIEsProvideAssistanceData information element (IE) is provided for future extensibility only and is not used so far. The LTE assistance data may thus be provided for A-GNSS and OTDOA. The EPDU-Sequence contains IEs that are defined externally to LPP by other organizations, which currently may only be used for OMA LPP extensions (LPPe). A similar structure exists for requestAssistanceData, as shown in FIG. 3, where the commonIEsRequestAssistanceData may optionally carry the serving cell ID (ECGI).

Since for OTDOA positioning PRS signals from multiple distinct locations need to be measured, the UE receiver may have to deal with PRS that are much weaker than those received from the serving cell. Furthermore, without an approximate knowledge of when the measured signals are expected to arrive in time and what is the exact PRS pattern, the UE must perform signal search within a large window. This can impact the time and accuracy of the measurements as well as the UE complexity. To facilitate UE measurements, the network transmits assistance data to the UE, which includes, among the others, reference cell information, neighbor cell list containing physical cell identifiers (PCIs) of neighbor cells, the number of consecutive downlink sub-frames, PRS transmission bandwidth, frequency, etc.

In OTDOA assistance data, some parameters, such as timing of positioning occasions in a neighbor cell, are specified relative to a reference cell. Furthermore, to identify the timing of the reference cell positioning occasion, the absolute timing of the reference cell has to be known. When the absolute timing of the reference cell is not known but is available for some other cell in the assistance data, the timing of the reference cell can be derived and then used for other cells for which only the relative timing is known.

Accordingly, the absolute timing of at least one cell included in the assistance data needs to be known. More specifically according to 3GPP TS 36.355, v10.0.0, Section 6.5.1.1 it is required that the location server should include at least one cell for which the System Frame Number (SFN) can be obtained by the UE.

One solution is to always include the serving cell in the assistance data, since the UE typically knows the absolute timing for the serving cell.

The UE synchronizes to a cell by performing correlation of the synchronization sequences. After performing cell synchronization, the UE typically acquires the System Frame Number (SFN) of the serving cell by reading the system information sent in the cell. The SFN is transmitted in the master information block (MIB), which in turn is sent over the Physical Broadcast Channel (PBCH). The PBCH is transmitted with a periodicity of 40 milliseconds with a repetition in sub-frame #0 of every frame within 40 milliseconds. In RRC idle mode, before camping on a cell, the UE reads its broadcast channel, which contains the system information. Any change in the system information is indicated to the UE by sending a page. In response the UE again reads the system information. In RRC connected mode, the UE acquires the system information via a UE-specific dedicated channel. Hence, typically, and by default, the UE does not read the system information of the cell. However it is possible for the network to request the UE to acquire and report the system information of the neighbor cell.

The UE generally does not read the system information of neighbor cells, as this increases UE power consumption and requires more complex implementation. The neighbor cell system information is only acquired by the UE upon receiving special request from the serving cell.

An example situation when the serving cell is not in the assistance data is one of the several possible scenarios for which inter-frequency RSTD requirements are specified. (The term "inter-frequency" as used herein refers to measurements performed by the UE either only on frequencies other than the serving cell frequency or on both non-serving frequencies and the serving cell frequency.) In the latter case, the reference cell may be on the serving cell frequency and the neighbor cells may be on the non-serving frequencies. In this scenario, all cells in the OTDOA assistance data, including the reference cell, operate on frequencies that differ from the serving-cell frequency (see, e.g., 3GPP TS 36.133, Section 8.1.2.6.1, Table 8.1.2.6.1-1, Note 1), which means that none of the cells is the serving cell.

According to the solution described earlier, the UE acquires the SFN of the reference cell received in the assistance data if the SFN of the reference cell is not yet known to the UE, such as when the reference cell is not the serving cell. Acquiring the SFN of a cell may be done, for example, by reading the broadcast channel of that cell. Acquiring the SFN of the reference cell may be triggered by receiving the assistance data, given that the SFN of the reference cell is not known to the UE, or the serving cell is not in the assistance data, or there is no other cell in the assistance data for which the SFN is known to the UE.

For E-CID, there are intra-frequency UE Rx-Tx (receive-transmit) accuracy and reporting delay requirements. ("Intra-frequency" measurements are taken on the serving cell frequency.) No inter-frequency requirements are currently defined for UE or eNodeB Rx-Tx measurements.

OTDOA uses RSTD measurements performed by the UE. For UE-assisted OTDOA, i.e., when the UE reports the measurements to the positioning node (e.g., E-SMLC), the following requirements have been defined in 3GPP TS 36.133:

Intra-frequency RSTD accuracy requirements,
Inter-frequency RSTD accuracy requirements,
Intra-frequency RSTD reporting delay requirements for FDD,
Intra-frequency RSTD reporting delay requirements for TDD,
Inter-frequency RSTD reporting delay requirements for FDD-FDD,
Inter-frequency RSTD reporting delay requirements for TDD-FDD,
Inter-frequency RSTD reporting delay requirements for TDD-TDD,
Inter-frequency RSTD reporting delay requirements for FDD-TDD.

For each of the inter-frequency requirements, two scenarios are considered:

Scenario1: inter-frequency RSTD measurements are performed over the reference cell and neighbor cells, which belong to the inter-frequency carrier frequency f2;

Scenario 2: inter-frequency RSTD measurements are performed over the reference cell and the neighbor cells, which belong to the serving carrier frequency f1 and the inter-frequency carrier frequency f2, respectively.

The 3GPP requirements discussed above are generic with respect to the frequency channels and frequency bands. In other words, the requirements are the same for any two different frequencies, independently of their absolute and relative location in the spectrum. This generic approach with regard to the frequency channels and bands has also been used for the specification of other measurement requirements, such as the mobility measurement requirements RSRP and RSRQ in LTE. It should be noted also that the requirements are currently common for inter-frequency. Furthermore, there may also be inter-RAT measurements, e.g., a UE connected to a CDMA may be performing LTE RSTD measurements.

To ensure that the positioning requirements are met, test cases are specified by the standard, against which the UEs are tested. Currently specified positioning test cases assume that the timing information for at least one cell (serving cell) in the assistance data is known to the UE. This means that the UEs in the tests are not required to acquire the timing information of any of the cells. In these tests, the UE is required to report the positioning measurements (i.e., RSTD) within limits, including time limits, specified by the test requirements. Failure to do so shall lead to the failure of the test. Hence, if prior to the start of the actual test the UE under test does not have the timing information of any of the cells to be measured for positioning, then it is quite likely that the UE will fail the tests.

It is mandatory for all UEs to support all intra-RAT measurements (i.e., inter-frequency and intra-band measurements) and meet the associated requirements. However the inter-band and inter-RAT measurements are UE capabilities, which are reported to the network during the call setup. The UE supporting certain inter-RAT measurements should meet the corresponding requirements. For example a UE supporting LTE and WCDMA should support intra-LTE measurements, intra-WCDMA measurements and inter-RAT measurements (i.e., measuring WCDMA when serving cell is LTE and measuring LTE when serving cell is WCDMA). Hence, a network can use any of these capabilities, according to its strategy. These capabilities are highly driven by factors such as market demand, cost, typical network deployment scenarios, frequency allocation, etc.

Inter-frequency measurements may in principle be considered for any positioning method, even though currently not all measurements are specified by the standard as intra- and inter-frequency measurements. The examples of inter-frequency measurements currently specified by the standard are Reference Signal Time Difference (RSTD) used for OTDOA, and RSRP and RSRQ, which may be used, for example, for fingerprinting or E-CID.

The UE performs inter-frequency and inter-RAT measurements in measurement gaps. The measurements may be done for various purposes: mobility, positioning, self organizing network (SON), minimization of drive tests etc. Furthermore, the same gap pattern is used for all types of inter-frequency and inter-RAT measurements. Therefore the radio access network (for LTE, referred to as the Evolved Universal Terrestrial Radio Access Network, or E-UTRAN) must provide a single measurement gap pattern with constant gap duration for concurrent monitoring (i.e., cell detection and measurements) of all frequency layers and RATs.

In LTE, measurement gaps are configured by the network to enable measurements on the other LTE frequencies and/or other RATs (e.g., UTRA, GSM, CDMA2000, etc). The gap configuration is signaled to the UE over the Radio Resource Control (RRC) protocol, as part of the measurement configuration. A UE that requires measurement gaps for positioning measurements, such as for OTDOA measurements, may send an indication to the network, upon which the network may configure the measurement gaps. Furthermore, the measurement gaps may need to be configured according to a certain rule. For instance, inter-frequency RSTD measurements for OTDOA require that the measurement gaps are configured according to the inter-frequency requirements in 3GPP TS 36.133, Section 8.1.2.6, e.g., not overlapping with PRS occasions of the serving cell and using gap pattern #0.

In general, in LTE inter-RAT measurements are defined similarly to inter-frequency measurements. For example, they may also require configuring measurement gaps like for inter-frequency measurements, but with more measurement restriction. The requirements for inter-RAT measurements may also be relaxed. As a special example, there may be multiple networks using overlapping sets of RATs. The examples of inter-RAT measurements specified currently for LTE are UTRA FDD CPICH RSCP, UTRA FDD carrier RSSI, UTRA FDD CPICH Ec/No, GSM carrier RSSI, and CDMA2000 1×RTT Pilot Strength.

For positioning, assuming that LTE FDD and LTE TDD are treated as different RATs, current standards define inter-RAT requirements only for FDD-TDD and TDD-FDD measurements, and the requirements are different in the two cases. There are no other inter-RAT measurements specified within any separate RAT for the purpose of positioning and which are possible to report to the positioning node (e.g., E-SMLC in LTE).

Inter-band measurement refers to the measurement done by the UE on a target cell on the carrier frequency belonging to the frequency band which is different than that of the serving cell. Both inter-frequency and inter-RAT measurements can be intra-band or inter-band.

The motivation for using inter-band measurements is that most of the UEs today support multiple bands even for the same technology. This is driven by the interest from service providers; a single service provider may own carriers in different bands and would like to make efficient use of carriers by performing load balancing on different carriers. A well known example is that of multi-band GSM terminal with 800/900/1800/1900 bands.

Furthermore a UE may also support multiple technologies, e.g., GSM, UTRA FDD and E-UTRAN FDD. Since all UTRA and E-UTRA bands are common, therefore the multi-RAT UE may support same bands for all the supported RATs.

A multi-carrier system (or interchangeably called a carrier-aggregation system) allows the UE to simultaneously receive and/or transmit data over more than one carrier frequency to enhanced data rate. Each carrier frequency is often referred to as a component carrier or simply a serving cell in the serving sector, more specifically a primary serving cell or secondary serving cell. The multi-carrier concept is used in both HSPA and LTE.

In an intra-RAT multi-carrier system, all component carriers belong to the same RAT. Examples are an LTE FDD multi-carrier system, an LTE TDD multi-carrier system, a UTRAN FDD multi-carrier system, a UTRAN TDD multi-carrier system, and so on.

In an LTE multi-carrier system it is possible to aggregate a different number of component carriers of different bandwidths in the uplink and the downlink. One of the component carriers is called the anchor carrier and the remaining ones are called supplementary carriers. Other terms used in literature for the anchor and supplementary carriers are primary and secondary carriers, respectively. Yet other commonly known terms for the anchor and supplementary carriers are the primary serving cell and secondary serving cell respectively. The primary carrier carries all common and UE-specific control channels. The secondary carrier may contain only necessary signaling information and signals, e.g., those that are UE-specific may be not present in the secondary carrier, since both primary uplink and downlink carriers are typically UE-specific. This means that different UEs in a cell may have different downlink primary carriers. The same is true for the uplink primary carriers. For example, in a multi-carrier system comprising of two downlink (F1_DL, F2_DL) and two uplink carriers (F1_UL, F2_UL), some of the UEs may have F1_DL as the primary carrier and remaining ones may have F2_DL as their primary carrier. The network is able to change the primary carrier of the UE at any time. This is done, for example, to balance the load on different carriers.

The component carriers may be contiguous or non-contiguous, as shown in FIG. 2. Furthermore, in the case of non-contiguous carriers, they may belong to the same frequency band or to different frequency bands. A hybrid carrier aggregation scheme comprising of contiguous and non-contiguous component carriers are also envisaged in LTE.

In inter-RAT multi-carrier system, component carriers may belong to different RATs. For example, in such systems one component carrier may belong to LTE FDD and another one to LTE TDD. In another example, component carriers belong to UTRAN FDD and E-UTRAN FDD. In such systems, one of the RATs may be considered as the main or primary RAT while the remaining ones as the auxiliary RATs.

Multi-band carrier aggregation allows a UE to simultaneously receive and transmit data over carriers belonging to different bands, e.g., bands 900 MHz and 1800 MHz.

Regardless of the number of aggregated bands, there is one primary or so-called anchor carrier in both HSPA and LTE-Advanced. Hence, the UE is required to perform the neighbor cell measurements, e.g., path loss, received signal strength, received signal quality etc., at least over the anchor carrier (or anchor band). Secondly, the carrier may be semi-dynamically changed. Thirdly, for the sake of coverage and load balancing, different UEs are typically assigned anchor carrier belonging to different bands. This means that a UE would typically be performing measurements over different bands, which could also lead to substantial difference in the reported values due to difference in the propagation condition. Despite this difference the measurements should be usable by the network for determining the UE position from the reference radio fingerprints.

SUMMARY

Several problems have been identified with previous techniques for performing positioning measurements with the aid of assistance data. First, while 3GPP specifications require that assistance data include at least one cell for which the timing information is known or for which the timing information can be obtained by the UE, there are practical scenarios where the serving cell may be not included. In some of these scenarios it is not straightforward for the positioning node to know whether the UE can obtain the timing information for a given cell at all, or to determine for which cells the UE can obtain the timing information. Second, if the positioning node sends the assistance data to the UE without accounting for the time needed by the UE to acquiring timing of the reference cell, then it may take longer than expected for the UE to perform measurement, which may in turn cause a test failure or a repeated transmission of the assistance data. A similar problem arises when test equipment and testing configurations do not allow time for acquiring the timing information.

Several techniques for addressing these issues are described herein, including processes carried out by a network node for determining assistance data transmission time to account for cell timing acquisition and signaling techniques for facilitating the acquisition of timing information for neighbor cells. Other techniques described herein include other methods, also carried out by a network node, for ensuring that either a cell with known timing information to the UE or for which the timing information can be obtained by the UE is included in the assistance data. Techniques carried out by a UE, for acquiring timing information for neighbor cells for the purpose of positioning, including deciding for which cells the timing information is to be acquired, are also described.

In an example method, a network node or test equipment may begin by first determining whether a target mobile terminal will need to obtain timing information for at least one cell in a set of cells to be included in the assistance data. In some embodiments, this may include evaluating previously reported measurements received from the mobile terminal, such as by determining whether the mobile terminal has measured any of the cells in the assistance data within a given measurement interval, e.g., during the preceding five second interval. The network node or test equipment then estimates or otherwise determines an acquisition time $\Delta T$ for the mobile terminal to obtain timing information for at least a first cell that will be identified in positioning assistance data to the mobile terminal. In some embodiments, this may be done by retrieving a stored, pre-determined value for the acquisition time, which pre-determined value may be one of several pre-determined values that are indexed or selected according to various characteristics of the cells at issue or according to relevant channel propagation characteristics or estimated signal qualities. In other embodiments, the acquisition time $\Delta T$ may be calculated, using a calculation that includes a processing time $\delta$ for the mobile terminal to process a message containing assistance data, a margin time $\alpha$, or both. In these and other embodiments, the calculation of the acquisition time $\Delta T$ may be based on one or more of a variety of factors that include radio propagation conditions for the first cell, an estimated received signal quality for the first cell, whether or not DRX is in use, a gap pattern density, whether a search is likely to be performed for intra-frequency, inter-frequency intra-band, inter-frequency inter-band, or inter-RAT cells, a number of carriers to be measured by the mobile terminal, transmitted subframes for which measurements are allowed, and whether or not the mobile terminal has one or more advanced receiver capabilities. In some of these and in other embodiments, the determination of the acquisition time $\Delta T$ can be further based on estimating a received signal quality for the first cell or otherwise acquiring an estimated received signal quality for the first cell from a database and comparing the estimated received signal quality to a threshold.

Once the network node or test equipment has determined the acquisition time $\Delta T$, it then transmits the positioning assistance data to the mobile terminal at least $\Delta T$ before an expected time for the mobile terminal to begin performing positioning measurements. This assistance data identifies the first cell discussed above, as well as one or more additional cells for measurement by the mobile terminal. Additional margin may be added to the acquisition time $\Delta T$ to come up with the precise lead time for transmitting the assistance data to the mobile terminal, to ensure that the mobile terminal has adequate time to acquire timing information before beginning measurements. In some embodiments, the network node or test equipment is configured to wait for a time period at least equal to an expected reporting delay that accounts for the acquisition time $\Delta T$, before deciding that the positioning has failed. Thus, the node or test equipment refrains from resending the assistance data, reporting positioning session failure, and/or reporting a positioning test failure untile the expected reporting delay has elapsed.

In several other techniques described herein a network node is configured to take steps to ensure that the assistance data includes either a cell with known timing information to the UE or a cell for which the timing information can be obtained by the UE. In one example of these techniques, a method implemented by a network node begins with an estimation of a signal quality for one or more cells, with respect to the mobile terminal. At least one cell having a signal quality exceeding a pre-determined threshold is identified, and then included in assistance data transmitted to the mobile terminal.

The described methods may be embodied in corresponding node and device embodiments, e.g., on testing equipment, positioning nodes, radio nodes, and UEs, configured to carry out one or more of these methods. Several of these embodiments, including processing circuits configured to carry out one or more of the techniques summarized above, are also described in the detailed discussion that follows. Of course, those skilled in the art will appreciate that the present invention is not limited to the above features, advantages, contexts or examples, and will recognize additional features and advantages upon reading the following detailed description and upon viewing the accompanying drawings.

BRIEF DESCRIPTION OF THE DRAWINGS

FIG. 2 illustrates the structure of the provideAssistanceData element in the LPP protocol.

FIG. 3 shows the structure of the requestAssistanceData element in the LPP protocol.

FIG. 4 shows an example of timing information provided in assistance data.

DETAILED DESCRIPTION

Figure 1:
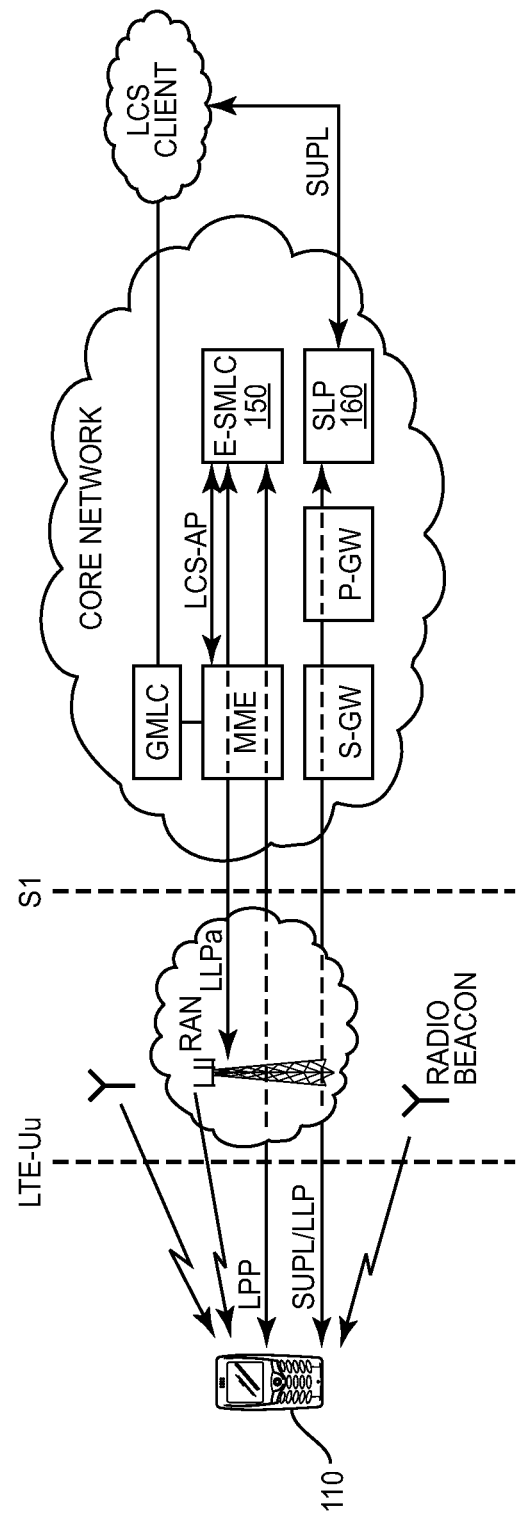
FIG. 1 illustrates components of the LTE positioning architecture.

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

While the following discussion focuses on positioning techniques and protocols used in LTE systems, the techniques described herein can be applied to various wireless communication systems configured for multi-carrier support, including those that use code division multiple access (CDMA), time division multiple access (TDMA), frequency division multiple access (FDMA), orthogonal frequency division multiple access (OFDMA), single carrier-frequency division multiple access (SC-FDMA), or other radio access and modulation schemes. CDMA-based systems include those that are based on specifications for Universal Terrestrial Radio Access (UTRA), CDMA2000, etc. UTRA in turn includes Wideband-CDMA (W-CDMA) and other variants of CDMA, while CDMA2000 includes IS-2000, IS-95 and IS-856 standards. Well-known TDMA systems include the Global System for Mobile Communications (GSM), while systems based on OFDMA include Evolved UTRA (E-UTRA), Ultra Mobile Broadband (UMB), IEEE 802.11 (Wi-Fi), IEEE 802.16 (WiMAX), IEEE 802.20, Flash-OFDM, etc.

Several problems have been identified with previous techniques for performing positioning measurements with the aid of assistance data. First, in 3GPP specifications there is a requirement on the OTDOA assistance data that it include at least one cell for which the timing information is known (e.g., the serving cell) or for which the timing information can be obtained by the UE. However, there are practical scenarios and also scenarios covered by the existing requirements (e.g., inter-frequency RSTD Scenario 1) where the serving cell may be not included. In some of these scenarios it is not straightforward for the positioning node to know whether the UE can obtain the timing information for a given cell at all. Furthermore, it is not always readily apparent for which cells the UE can obtain the timing information.

Second, the assistance data may not include the serving cell. In that case, the UE must acquire the timing of the reference cell. However, in previous solutions the positioning node sends the assistance data to the UE without accounting for the time required by the UE for acquiring the timing of the reference cell. This may lead to a longer than expected time to perform RSTD measurements, since the UE may not be able to use all possible positioning occasions containing the PRS for RSTD measurements. In this case, the UE may report the RSTD measurements beyond the expected or specified reporting delay to the positioning node. In the meantime, the positioning node may send another request or generate a failure case. This is a particularly significant problem in the case of inter-frequency OTDOA measurement, since in this case the acquisition of the timing information may require several seconds.

Third, currently specified positioning test cases assume that cell timing is available for at least one cell (serving cell) in the provided assistance data. Accordingly, test equipment and testing configurations do not allow time for acquiring the timing information. Consider a test case where the UE does not have prior information about the timing of none of the reference and neighboring cells. During the test, the UE should therefore first acquire the timing of at least one cell, e.g., reference cell. In such test, if the test equipment or the system simulator emulating the positioning node sends the assistance data to the UE using conventional techniques, then the UE may fail the test, even though it is actually compliant to the OTDOA core requirements. In addition, there are currently no positioning test cases for verifying that the UE is capable of acquiring the timing information intra-frequency neighbor cells, inter-frequency intra-band neighbor cells, inter-frequency inter-band neighbor cells, inter-RAT neighbor cells. Further, there are no positioning test cases for verifying that a carrier-aggregation-capable UE can acquire timing information for neighbor cells which operate on the primary carrier or on any of the secondary component carriers. Still further, there are no positioning test cases for verifying that the UE is capable of acquiring the timing information of a neighbor cell while at the same time meeting the corresponding intra- or inter-frequency RSTD requirements.

Finally, another problem with current approaches is that when the UE realizes that there is no cell in the assistance data for which the timing information is known to the UE, it is not straightforward to determine for which cell the timing information should be acquired. One approach is that the UE should always acquire the timing information for the reference cell. However, the assistance data may contain cells on up to four frequencies (see 3GPP TS 36.355) and potentially on multiple RATs (note that LTE FDD and LTE TDD are considered to be different RATs), where the RATs may or may not be limited to LTE. The UE may also receive complementary assistance data in LPPe, containing more cells, delivered in the same LPP message.

Several techniques for addressing these issues are described in detail below. These techniques include methods, carried out by a network node, for determining assistance data transmission time to account for cell timing acquisition, as well as signaling techniques for providing the UE with the timing information of at least one cell, for which SFN is unknown, or for facilitating acquiring the timing information of neighbor cell(s) performed by UE. Other techniques described below include methods, also carried out by a network node, for ensuring that either a cell with known timing information to the UE or for which the timing information can be obtained by the UE is included in the assistance data. Techniques for implementation by a mobile terminal are also described, including methods and pre-defined rules in the UE for acquiring timing information for neighbor cells for the purpose of positioning, including deciding for which cell(s) the timing information is to be acquired.

The described methods may be embodied in corresponding node and device embodiments, e.g., on testing equipment, positioning nodes, radio nodes, and UEs, configured to carry out one or more of these methods. Those skilled in the art will appreciate that although these techniques are described herein in the context of an LTE system, the various techniques are not limited to the currently standardized positioning measurements and methods, and may be adapted to other systems and to accommodate other positioning techniques and measurement methods.

In the discussion that follows, the term "timing information" is used in connection with a given cell to refer to one or more of: the System Frame Number (SFN) of the cell; a SFN offset or sub-frame offset or time offset of the cell with respect to other cell (e.g., a cell with known SFN such as serving/primary cell); or other information that allows a mobile terminal to derive the SFN of a cell, given the SFN of another cell (e.g., the serving cell). The term "assistance data," as used in this disclosure, should be understood in a broad sense as the data transmitted by a network node to the UE in order to assist in positioning measurements. Assistance data generally comprises at least a list of cells (e.g., cell identifiers).

Although the description herein often uses the 3GPP term "UE," it should be understood that this term should be understood for the purposes of this disclosure as generally referring to any wireless device or node, such as a PDA, laptop, mobile, sensor, fixed relay, mobile relay or even a small base station, which is being positioned within the context of a wireless networks. The techniques disclosed herein apply for UEs that are capable or not of performing inter-frequency measurements without gaps, and apply to UEs capable of carrier aggregation.

A "cell" is associated with a radio node, where a radio node or eNodeB, used interchangeably in the invention description, refers in a general sense any node transmitting radio signals that may be used for positioning, measurements, e.g., eNodeB, macro/micro/pico base station, home eNodeB, relay, beacon device, or repeater.

A "positioning node" as described in various embodiments herein is a node with positioning functionality. For example, for LTE it may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC. In a testing environment, a positioning node may be simulated or emulated by test equipment. In this case, the tests are carried out in a lab or in any controlled environment. In addition, the test cases to verify the positioning requirements can also be performed in a field such as in a live or real network. In live tests, the actual positioning node is involved.

The signaling described in the invention is either via direct links or logical links that may be carried over any of a variety of physical links (e.g., via higher layer protocols and/or via one or more network nodes). For example, in LTE, in the case of signaling between E-SMLC and LCS Client, the positioning result may be transferred via multiple nodes (at least via MME and GMLC).

Applications of the techniques described herein are not limited to LTE, but may apply with any RAN, single- or multi-RAT. Some other RAT examples are LTE-Advanced, UMTS, GSM, cdma2000, WiMAX, and WiFi.

Assistance data that includes the cells for performing positioning measurements by the UE is signaled to the UE by the network node. Examples of network nodes considered here are positioning node, test equipment, system simulator, or any node emulating the positioning node, radio network node, etc.

In several scenarios it is likely that the UE does not know the SFN of any of the cells included in the assistance data. For example, when the UE is requested to perform the positioning measurements on the inter-frequency cells, where all cells (including the reference cell) belong to the non-serving carrier frequency, the UE may not have any timing information (i.e., time synchronization and SFN) for any of the cells in the assistance data. When the UE does not know the SFN of any of the cells in the assistance data then it has to first acquire the SFN of at least one cell before it can start performing the positioning measurements (e.g., RSTD in LTE). Furthermore, the UE has to first acquire the timing of the cell whose SFN is to be determined. This requires additional delay, as further described below. The techniques described here enable the network node to take into account the time required by the UE to acquire the necessary timing of at least one cell before the UE starts the actual positioning measurements.

In one approach, a network node is configured to transmit assistance data to the UE at a certain time prior to the time at which the UE can start performing the positioning measurements. The interval between the assistance data transmission and the expected start time for the measurements should be at least $\Delta T0$, where:

$$\Delta T0 = \Delta T1 + \delta + \alpha,$$

where $\Delta T1$ is an estimated time needed for the UE to obtain timing for at least one cell identified in the assistance data, $\delta$ is the time required by the UE to process the received message containing the assistance data (e.g., $\delta=150$ milliseconds), and $\alpha$ accounts for any required additional margin (e.g., in the network node or in the test equipment). As a special case, $\alpha=0$.

With this approach, the time period $\Delta T0$ can be a pre-determined value that is used by the network node. This approach is particularly useful for test equipment, since the test conditions (e.g., geometry factor or signal levels or quality of cells, propagation, etc) are pre-determined in the test. Hence, the correct value of the time period ($\Delta T0$) can be pre-determined. The test equipment will therefore store the pre-determined value of the time period. If the test is performed in a live network, then during the live test the actual positioning node will perform steps similar to those carried out by the equipment e.g. storing the pre-determined value ($\Delta T0$) and sending the assistance data to the UE at least time period $\Delta T0$ before the UE starts performing the positioning measurements.

This approach is also useful in the event that the network node or test equipment is certain that the UE does not know the cell timing of any of the cells in the assistance data. Hence, the network node does not have to explicitly check or verify whether the UE knows the cell timing of the cell or not. The use of a pre-determined lead time $\Delta T0$ therefore also leads to relatively simpler implementation in the network node and fully guarantees that the UE meets the positioning requirements and the UE compliant to the standardized requirements does not fail the test. In case the network is uncertain of whether the UE knows the cell timing of at least one cell, then it may one of the techniques described below.

In another, related approach, a network node is configured to determine, i.e., estimate, the time period $\Delta T1$ required by the UE to obtain the timing information of at least one cell which is included in the assistance data. Again, the network node transmits the assistance data to the UE at least $\Delta T0$ before the UE can start performing the positioning measurements, where again $\Delta T0=\Delta T1+\delta+\alpha$. Again, $\delta$ is the time required by the UE to process the received message containing the assistance data, and cc accounts for any required additional margin, whether in the network node or in the test equipment.

In still another, related approach, the network node is configured to first determine whether the UE is required to obtain the timing information of the at least one cell in the assistance data before it can start performing the positioning measurements. If so, the network node transmits the assistance data in advance according one of the techniques discussed immediately above. In other words, the network node transmits the assistance data to the UE at least time period $\Delta T0$ before the UE starts performing the positioning measurements. If the UE is expected to already have timing information for at least one cell in the assistance data, then the advance time needed for the assistance is lessened to an interval $\Delta T2$, where:

$$\Delta T2 = \delta + \alpha$$

where $\delta + \alpha$ are defined as before. In this case, the assistance data needs to be transmitted at least $\Delta T2$ before the UE starts performing the positioning measurements.

Also described in detail below are approaches to determining whether the UE already has timing information for a given set of cells. The general idea is that the network node may use previously reported UE measurements or historical information of the measurements, for example, to identify whether the UE knows the timing of at least one cell in the assistance data. For instance, if the network knows that the UE has not measured any of the cells in the assistance data over a given time interval (T_measure), such as five seconds, then the network may assume that the UE does not know the timing of any of the cells in the assistance data. On the other hand, timing information or a given cell may be considered to be known by the UE if the cell has been measured by the UE at least once over the last 5 seconds. Hence, if the network node has received any measurement or any indication from the UE depicting that the UE has measured the cell over the last T_measure (e.g., 5 seconds) then the network node may assume that the cell timing is known to the UE. Otherwise, the network may assume that the cell timing is not known to the UE.

There are several advantages to various embodiments of these techniques. First, these techniques may be used to ensure that the UE reports the positioning measurements to the network within the expected time in accordance with the performance required, thus fulfilling RSTD measurement reporting delay requirement and/or fulfilling RSTD measurement accuracy requirements, for example. They may also be used to ensure that UEs compliant to the standardized performance requirements don't fail the test because of improper test assumptions. It will be apparent from the following discussion that the cell acquisition time can be quite long in some scenarios, and may be longer than the currently specified RSTD reporting delay. Hence, if the assistance data is not sent the necessary time (e.g., at least $\Delta T1$) before the UE starts the positioning measurements, in the event that the timing of all the cells in the assistance data is unknown, then a UE compliant to the standardized requirements, and in particular, compliant to the RSTD reporting delay requirement, will nevertheless fail the test. These techniques may also be used to prevent the network node from resending the assistance data or reporting or otherwise declaring a positioning session failure. This is because the network node may expect UE reports to be received much earlier than the actual time, if the network node does not consider the cell timing acquisition time.

The acquisition time period $\Delta T1$ referred to in the above discussion depends upon at least two factors: the time needed to search for a given cell and the time needed to acquire the SFN of the cell. The time period ($\Delta T0$) may also include additional delay due to uncertainty time when reading SFN and due to UE implementation constraints, etc. For example, the estimated acquisition time period $\Delta T1$ can be expressed as:

$$\Delta T1 = T\_cell\_search + T\_SFN + T\_uncertain + T\_implementation\_margin$$

Estimation of the estimated acquisition time period $\Delta T1$ will differ depending on whether discontinuous receive (DRX) is in use. First, the estimation process in a non-DRX scenario is considered. For example, one scenario might include a requirement to acquire timing for a FDD inter-frequency cell whose SFN is to be determined by the UE using measurement gap pattern #0 (i.e., 40 ms periodicity), where the UE has no information about the timing of this cell and where the UE is in non-DRX state. From 3GPP TS 36.133, the time required to search the cell (i.e., T_cell_search) when SCH Ês/Iot≥−4 dB is expressed as:

$$T_{Identify\_Inter} = T_{Basic\_Identify\_Inter} \cdot \frac{480}{T_{Inter1}} \cdot N_{freq} \text{ ms,}$$

where:

$$T_{Basic\_Identify\_Inter} = 480 \text{ ms, and}$$

$$T_{inter1} = 60 \text{ ms for gap pattern id #0.}$$

Hence the T_cell_search for the inter-frequency cell=3840 ms.

According to 3GPP TS 36.133, Release 9, the time to acquire the system information (MIB and SIB1) of the inter-frequency cell when Synchronization Channel (SCH) Ês/Iot≥−4 dB is about 150 ms. The MIB contains the SFN. Hence the SFN could be decoded in less than 100 ms. Considering some implementation margin and frame uncertainty, it follows from the previous assumptions that the overall time period ($\Delta T0$) can be up to approximately 4 seconds when no DRX is used and when SCH Ês/Iot≥−4 dB.

On the other hand, in the event that the SCH Ês/Iot is higher than −4 dB then the ($\Delta T0$) can be shorter than 4 seconds. Hence, if the radio conditions (e.g., SINR) of the cell whose timing is to be acquired by the UE are known to the network node, then it can determine the ($\Delta T1$), which may be shorter than 4 seconds. Otherwise, if the radio conditions are not known or if the cell's SCH Ês/Iot is about −4 dB, then the value of the $\Delta T1$ can be set to 4 seconds.

Next, the estimation process in a DRX scenario is considered. For example, one scenario might include a requirement to acquire timing for the same FDD inter-frequency cell discussed above, whose SFN is to be determined by the UE using measurement gap pattern #0 (i.e., 40 ms periodicity). Again, the UE has no information about the timing of this cell, but in this case the UE is in DRX, with a DRX time of 1.28 second. From 3GPP TS 36.133, the time required to find the cell (i.e., T_cell_search) when SCH Ês/Iot≥−4 dB is about 1.28 second*20=25.6 seconds. For a longer UE DRX cycle of 2.56 seconds, the T_search=20*2.56 s=51.6 seconds. The time to acquire system information in DRX, once the cell is found, is the same as in the non-DRX scenario. Hence, including other factors, i.e., SFN acquisition, frame uncertainty, etc., the overall time period ($\Delta T1$) is approximately 26 seconds, under the first set of assumptions discussed above.

Cell search and SFN acquisition are influenced by various factors such as radio conditions. In general, the network node (e.g., system simulator, test equipment, positioning node, etc) has to take into account one or more of the following factors in order to correctly determine the time period (ΔT1):

- radio conditions and propagation characteristics, e.g., AWGN, fading, channel profile in general, channel delay spread, UE speed, etc.;
- received signal quality of the cell, e.g., SINR level, signal strength level;
- whether or not DRX cycle is used;
- DRX cycle in case DRX cycle is used,
- Gap pattern density, e.g., gap id #0 or id #1;
- whether the search is likely to be performed for intra-frequency, inter-frequency intra-band, inter-frequency inter-band, or inter-RAT cells (e.g., the network node may assume that the UE will always try to acquire the timing information for the reference cell);
- a number of carriers to be measured;
- a level of transmission activity and allowed measured sub-frames. Examples are: DTX level, whether MBSFN is used or not, allowed number of measurable sub-frames, e.g., indicated by patterns signaled over RRC to facilitate inter-cell interference coordination in heterogeneous networks, TDD configuration (UL-DL sub-frame configuration and special sub-frame configuration etc);
- UE receiver capabilities, e.g., relatively shorter time in case UE has an advanced receiver.

In a test environment, the above conditions are pre-determined and known to the test equipment. Therefore, a pre-determined value of the acquisition time period ΔT1 can be specified. The test equipment has to therefore send the assistance data at least time period ΔT0 before the UE can start performing the positioning measurements. In another non-limiting test example, it may be assumed that the timing information is known for at least one cell, e.g., the reference cell, which is not on the serving cell frequency. In this example, there may be no need to provide the assistance data long in advance to account for the time necessary for the UE to acquire the timing information, but in this case the tester needs to be sure about how the UE obtains this missing information. The timing information in this situation might be provided by the network/test equipment, e.g., by signaling techniques described in further detail below, for example, or might be available from prior positioning measurements, e.g., from the stored information in the UE, as also described in further detail below.

An example of a test case where the test equipment has to send the assistance well in advance, to allow the UE to acquire the timing information, is now provided. In this example test case, E-UTRAN FDD-FDD inter-frequency RSTD measurements must be reported, with the test evaluating the reporting delay test. In this example test case, the reference cell is on a non-serving carrier frequency. This is only one example test case, of course; the details of the test may differ in other tests (e.g., the number of measured neighbor cells may be one, not two as in the example below). Further, no DRX may also be assumed in other test case examples, or DRX may start only after the cell timing information has been acquired.

Test Purpose and Environment

The purpose of the test is to verify that the FDD-FDD inter-frequency RSTD measurement reporting delay meets the requirements specified in Section 8.1.2.6.1, specifically for Note 1 in Table 8.1.2.6.1-1, in an environment with fading propagation conditions.

In the test there are four synchronous cells: Cell 1, Cell 2, Cell 3, and Cell 4. Cell 1 is the reference. Cell 2 and Cell 3 are the neighbor cells. Cell 4 is the serving cell. Cell 4 is on FDD RF channel 1. Cell 1, Cell 2, and Cell 3 are on a FDD RF channel 2.

The UE requires measurement gaps to perform inter-frequency measurements. Gap pattern configuration #0 as defined in Table 8.1.2.1-1 is provided and configured to not overlap with PRS sub-frames of Cell 4.

The test consists of three consecutive time intervals, with duration of T1, T2 and T3. Cell 1 and Cell 4 are active in T1, T2 and T3, whilst Cell 2 and Cell 3 are activated only in the beginning of T2. Cell 1 and Cell 2 are active until the end of T3, and Cell 3 is active until the end of T2. The beginning of the time interval T2 shall be aligned with the first PRS positioning sub-frame of a positioning occasion in the Cell 1, where the PRS positioning occasion is as defined in Section 8.1.2.5.1. Cell 1 and Cell 3 transmit PRS in T2. Cell 2 transmits PRS only in T3. Cell 4 transmits PRS in T1, T2 and T3. Note: The information on when PRS is indicated as muted is conveyed to the UE using PRS muting information.

The OTDOA assistance data as defined in TS 36.355, Section 6.5.1, shall be provided to the UE during T1. The last TTI containing the OTDOA assistance data shall be provided to the UE ΔT=ΔT1+ΔT2 ms before the start of T2, where ΔT1=150 ms is the maximum processing time of the OTDOA assistance data and ΔT2=4000 ms is the maximum time required by the UE to acquire the timing information of the reference cell. Prior to start of the time period T2 UE shall not have any timing information of Cell 1, Cell 2 and Cell 3. The measurement gap configuration is known and configured in the UE ΔT before the start of T2.

| General test parameters for E-UTRAN FDD-FDD inter-frequency RSTD measurement reporting delay under fading propagation conditions | | | |
|---|---|---|---|
| Parameter | Unit | Value | Comment |
| Reference cell | | Cell 1 | Reference cell is the cell with respect to which the RSTD measurement is defined, as specified in 3GPP TS 36.214 [4] and 3GPP TS 36.355 [24]. The reference cell is on RF channel 2. |
| Neighbor cells | | Cell 2 and Cell 3 | Cells on RF channel 2. The cells appear at random places in the neighbor cell list in the OTDOA assistance data, but Cell 2 always appears in the first half of the list, whilst Cell 3 appears in the second half of the list. |

General test parameters for E-UTRAN FDD-FDD inter-frequency RSTD measurement reporting delay under fading propagation conditions

| Parameter | Unit | Value | Comment |
| --- | --- | --- | --- |
| Serving cell | | Cell 4 | Cell on RF channel 1 |
| PCFICH/PDCCH/PHICH parameters | | DL Reference Measurement Channel R.6 FDD | As specified in section A.3.1.2.1 |
| Channel Bandwidth ($BW_{channel}$) | MHz | 10 | |
| PRS Transmission Bandwidth | RB | 50 | PRS are transmitted over the system bandwidth |
| Gap pattern Id | | 0 | As specified in Table 8.1.2.1-1. Applies for measurements on Cell 1, Cell 2 and Cell 3 |
| Gap offset | | 9 | As specified in 36.331 [2], Section 6.3.5 |
| PRS configuration index $I_{PRS}$ | | Cell 4: 1231, Cell 1, Cell 2, Cell 3: 1131 | This corresponds to periodicity of 1280 ms and PRS sub-frame offset of $I_{PRS}$-1120 DL sub-frames, as defined in 3GPP TS 36.211 [16], Table 6.10.4.3-1 |
| Number of consecutive downlink positioning sub-frames $N_{PRS}$ | | 1 | As defined in TS 36.211 [16]. The number of sub-frames in a positioning occasion |
| Physical cell ID PCI | | (PCI of Cell 1-PCI of Cell 2)mod6 = 0 and (PCI of Cell 1-PCI of Cell 3)mod6 = 0 | The cell PCIs are selected such that the relative shifts of PRS patterns among cells are as given by the test parameters |
| CP length | | Normal | |
| DRX | | ON | DRX parameters are further specified in Table A.8.13.1.1-3 |
| PRS sub-frame offset | | 1180 | The corresponding parameter in the OTDOA assistance data is prs-SubframeOffset specified in TS 36.355 [24] |
| Maximum sub-frame shift between the cells at the UE antenna connector[Note 1] | μs | 3 | |
| Expected RSTD[Note 1] | μs | 3 | The expected RSTD is what is expected at the receiver. The corresponding parameter in the OTDOA assistance data specified in TS 36.355 [24] is the expectedRSTD indicator |
| Expected RSTD uncertainty | μs | 5 | The corresponding parameter in the OTDOA assistance data specified in TS 36.355 [24] is the expectedRSTD-Uncertainty index |
| Number of cells provided in OTDOA assistance data | | 16 | The list includes the reference cell on RF channel 2 and 15 other cells on RF channel 2 |
| PRS muting info | | Cell 1: '1111111100000000' Cell 2: '0000000011111111' Cell 3: '1111111100000000' | Correponds to prs-MutingInfo defined in TS 36.355 [24] |
| T1 | s | 10 | The length of the time interval from the beginning of each test |
| T2 | s | 10 | The length of the time interval that follows immediately after time interval T1 |
| T3 | s | 10 | The length of the time interval that follows immediately after time interval T2 |

[Note 1] The expected RSTD shall be in accordance with the true time difference modelled in the test at the UE receiver, i.e., the receive time difference for each two cells as seen at the UE antenna connector is within expected RSTD uncertainty window centered at expectedRSTD, after subtracting the PRS sub-frame offset, and it shall be different for Cell 2 and Cell 3.

Figure 5:
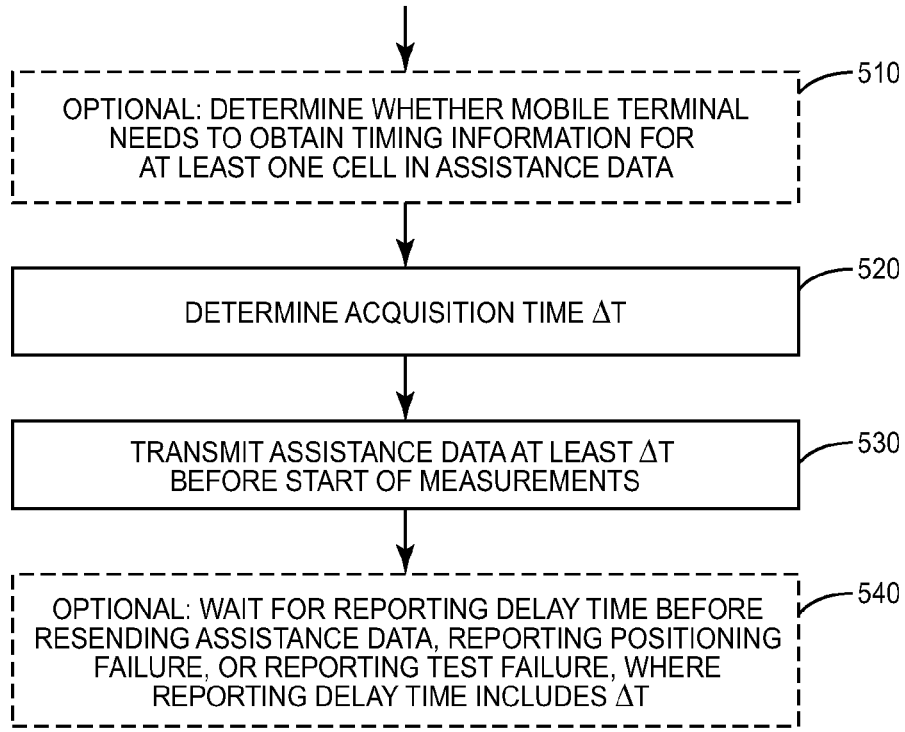
FIG. 5 is a process flow diagram illustrating an example method for acquiring positioning data for a mobile terminal, according to some embodiments of the present invention.

The process flow diagram of FIG. 5 illustrates a generalized embodiment of the above techniques, as might be implemented in a network node such as an eNB, an E-SMLC, an SLP, or other node involved in positioning one or more mobile terminals, or in test equipment emulating one or more network nodes for test purposes. As shown at block 510, in some embodiments the node or test equipment may begin by first determining whether a target mobile terminal will need to obtain timing information for at least one cell in a set of cells to be included in the assistance data. In other words, the node or test equipment determines whether or not the mobile terminal already has timing information for at least one cell in the group. In some embodiments, this may include evaluating previously reported measurements received from the mobile terminal, such as by determining whether the mobile terminal has measured any of the cells in the assistance data within a given measurement interval, e.g., during the preceding five second interval. In FIG. 5, the operation in block 510 is identified as "optional" to indicate that it does not necessarily appear in all embodiments of the invention that apply the method generally outlined in the figure.

As shown at block 520, the network node or test equipment estimates or otherwise determines an acquisition time $\Delta T$ for the mobile terminal to obtain timing information for at least a first cell that will be identified in positioning assistance data to the mobile terminal. In some embodiments, this may be done by retrieving a stored, pre-determined value for the acquisition time, which pre-determined value may be one of several pre-determined values that are indexed or selected according to various characteristics of the cells at issue or according to relevant channel propagation characteristics or estimated signal qualities. In other embodiments, the acquisition time $\Delta T$ may be calculated, using a calculation that includes a processing time $\delta$ for the mobile terminal to process a message containing assistance data, a margin time $\alpha$, or both. In these and other embodiments, the calculation of the acquisition time $\Delta T$ may be based on one or more of a variety of factors that include radio propagation conditions for the first cell, an estimated received signal quality for the first cell, whether or not DRX is in use, a gap pattern density, whether a search is likely to be performed for intra-frequency, inter-frequency intra-band, inter-frequency inter-band, or inter-RAT cells, a number of carriers to be measured by the mobile terminal, transmitted subframes for which measurements are allowed, and whether or not the mobile terminal has one or more advanced receiver capabilities. In some of these and in other embodiments, the determination of the acquisition time $\Delta T$ can be further based on estimating a received signal quality for the first cell or otherwise acquiring an estimated received signal quality for the first cell from a database and comparing the estimated received signal quality to a threshold.

Once the network node or test equipment has determined the acquisition time $\Delta T$, it can then transmit the positioning assistance data to the mobile terminal at least $\Delta T$ before an expected time for the mobile terminal to begin performing positioning measurements, as shown at block 530. This assistance data identifies the first cell discussed above, as well as one or more additional cells for measurement by the mobile terminal. Additional margin may be added to the acquisition time $\Delta T$ to come up with the precise lead time for transmitting the assistance data to the mobile terminal, to ensure that the mobile terminal has adequate time to acquire timing information before beginning measurements.

In some embodiments, the network node or test equipment is configured to wait for a time period at least equal to an expected reporting delay that accounts for the acquisition time $\Delta T$, before deciding that the positioning has failed. Thus, the node or test equipment refrains from resending the assistance data, reporting positioning session failure, and/or reporting a positioning test failure untile the expected reporting delay has elapsed. In FIG. 5, this operation is indicated as "optional," as it is not necessarily included in all embodiments of the method generally outlined in FIG. 5.

In addition to the above-described techniques for estimating an acquisition time needed for a UE to obtain timing information for a cell identified in positioning assistance, in some embodiments of the techniques described herein a network node is configured to take steps to ensure that the assistance data includes either a cell with known timing information to the UE or a cell for which the timing information can be obtained by the UE. One approach in such a network node, which may be, for example, a positioning node, a system simulator, test equipment, a self-organizing network (SON) node, or an Operations & Maintenance (O&M) node, is based on estimating the signal level and/or quality of the cell, and may be carried out before finally determining what cells are included in the assistance data. This approach may be applied in various circumstances, including when the cell is not the serving cell of the UE, for example, or when the serving cell of the UE is not known to the network node.

Figure 6:
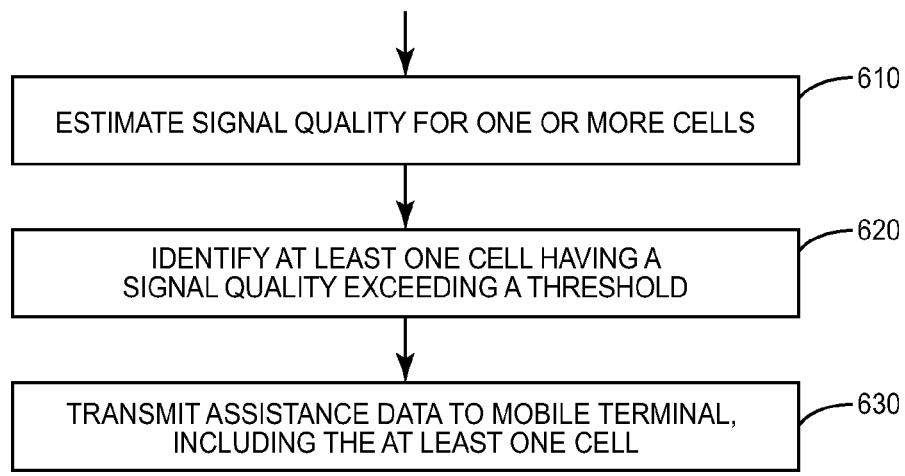
FIG. 6 is a process flow diagram illustrating another example method for acquiring positioning data for a mobile terminal.

This technique is outlined in the process flow illustrated in FIG. 6. As shown at block 610, the process begins with an estimation of a signal quality for one or more cells, with respect to the mobile terminal. At least one cell having a signal quality exceeding a pre-determined threshold is identified, as shown at block 620, and the network node then includes this at least one cell in assistance data transmitted to the mobile terminal, as shown at block 630.

More particularly, various embodiments of this technique comprise estimating or acquiring (e.g., from a database) the expected signal quality, such as the signal power level or a signal-to-noise ratio, and comparing to a corresponding threshold. If the signal quality is below the threshold, the network node may assume that the UE will not be able to obtain the timing information. The threshold value may be a pre-determined, static, value, in some embodiments, or may be calculated from system conditions or based on test requirements, in others.

In a related approach, if a given set of cells for the assistance data does not include a cell for which the UE is expected to know the SFN (e.g., the serving cell), the network node is configured to verify that the set includes at least one cell for which the signal quality is expected to be above a certain threshold, e.g., received quality of PRS (PRS $\hat{E}_s/\text{Iot} \geq -4$ dB, or to add at least one additional cell that meets this criterion. In still another approach, a cell that meets this condition is included in the assistance data as the reference cell. In yet another embodiment, when there is no cell in the assistance data for which the UE is expected to have or be able to obtain the timing information, the expected best cell among those in the assistance data is always included as the reference cell.

In some implementations, in order to resolve the timing information issue, the serving cell is always included in the list, but the UE may or may not report measurements for the serving cell. In some of these embodiments, for example, the UE may omit measurement reports for the serving cell when it is not the reference cell, or when all the other cells in the assistance data are on another frequency, or when PRS information is not included or is incomplete for the cell, or when PRS are indicated as always muted for the cell. It will be understood that various combinations of these criteria may be used, in some embodiments. It will also be appreciated that some of these criteria, such as the last two, may be applied to other cells as well, so that measurement reports are not provided for those cells when the criteria is met.

Other embodiments of the techniques described herein include methods carried out by the UE. These include methods for acquiring timing information for neighbor cells for the purpose of positioning, including methods and pre-defined rules in the UE to decide for which RAT, which band, which frequency, and/or for which cells timing information is to be acquired by the UE, where the cells at issue are included in positioning assistance data received by the UE. In some embodiments, the UE may acquire the timing information only for cells of the same RAT, or the same frequency band, or the same frequency, or the same class of cells. A class of cells may comprise a power class of the associated BS, e.g., macro/micro/pico/home BSs. A class of cells may be distinguished, for example, by receiving the cell information in different blocks though still in the same message. For instance, the information for home eNodeB cells may be signaled separately from other cells in LPPe. In other embodiments, the UE may acquire the timing information for cells for a selected subset of RATs (e.g., WCDMA or CDMA), a subset of bands (e.g., only low- or only high-frequency bands or frequency bands close to the band of the serving/primary cell), a subset of frequencies (e.g., frequencies within a certain offset from the serving/primary carrier), or a subset of cells (e.g., only macro or pico cells, but not femto cells).

The UE may also decide the cell or cells for which the timing information is to be acquired based on each cell's position in the assistance data. For example, in some embodiments, the acquiring of the timing information is performed for the cell indicated as the reference cell in the assistance data.

In other embodiments, the UE performs the acquiring of the timing information for a cell in the neighbor cell list, where the cell is selected accounting for ordering in the list. For example, when the neighbor cell list is sorted in the decreasing order of priority for measurement to be performed by the target device, with the first cell in the list being the highest priority for measurement, the UE may select the first cell in the list. Selecting of the first cell may be motivated by the expected high signal quality and thus faster cell search.

In yet other embodiments, the UE performs the acquiring of the timing information for more than one cell in order to acquire the timing information. For example, the UE may try to search for the reference cell and the first cell in the neighbor cell list. In still other embodiments, when the UE receives positioning assistance data with no serving cell included, the UE acquires the timing information from the locally stored database. The database maybe maintained by the UE for positioning or other purposes, e.g., for neighbor cells searched or cells for which the timing information has been received for positioning purpose, and used, e.g., for positioning, mobility performance enhancement, or other purposes.

Embodiments of the techniques described herein further include signaling techniques that facilitate acquiring the timing information of neighbor cells to be performed by the UE. A signaling means according to these embodiments includes the means for communicating the timing information to the UE, or communicating the information facilitating accessing the timing information by the UE (e.g., the information about the channel or the transmission occasions, e.g., periodicity).

In one embodiment, the timing information may be provided to the UE in the assistance data, e.g., for the reference cell. The timing information may be included in the reference cell information, such as in the example reference cell information given in FIG. 4.

Figure 7:
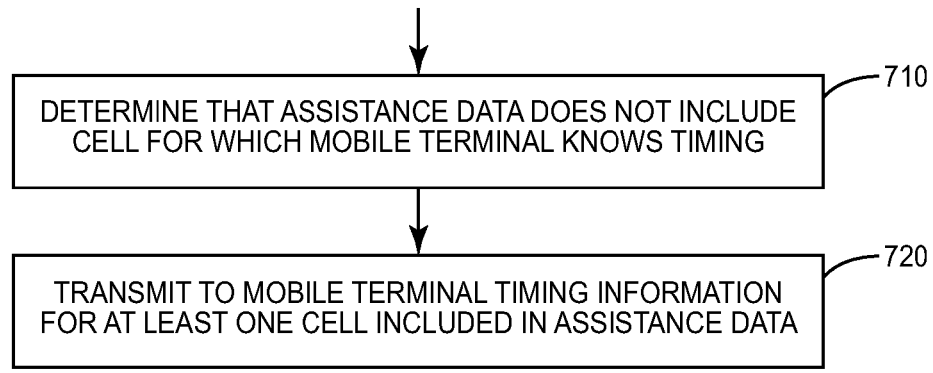
FIG. 7 is another process flow diagram illustrating an example method for acquiring positioning data for a mobile terminal.

One technique is illustrated in FIG. 7. As shown at block 710, the network node determines that a set of cells included in positioning assistance data to be transmitted to the mobile terminal does not include at least one cell for which the mobile terminal already knows the timing. As shown at block 720, the network node then transmits timing information for a first cell in the assistance data to the mobile terminal.

In another, related, embodiment, the timing information is provided whenever serving cell is not in the assistance data. In yet another embodiment, the timing information may be provided when muting information is included in the assistance data for at least one cell and the SFN=0 of the reference cell is not known. An alternative solution is to not allow inclusion of muting information in the assistance data when the UE does not know or cannot obtain the timing information of the reference cell or to assume that the UE may ignore the muting information if the information for the cells in the assistance data is not sufficient to apply the muting information. In another embodiment, the timing information is coarse timing information, e.g., the SFN of a cell at a time of creating the assistance data.

Signaling of the timing information is carried out by higher-layer protocols, e.g., the protocols used for positioning. In one embodiment, the timing information for at least one cell is included in the positioning assistance data. The information may be signaled in the same message as the OTDOA assistance data, e.g., in the same LPP message, and may be included in LPP or LPPe.

For example, the corresponding information may be included in LPP in the element describing the reference cell (e.g., OTDOA-ReferenceCellInfo) or in the element describing a neighbor cell (e.g., OTDOA-NeighborCellInfoElement). In yet another embodiment, the complementary assistance data is provided within the same session (e.g., via LPPe in the same LPP message or as another LPP message), where the complementary data may include the cell for which the UE knows the timing information and at least one of the cells for which the assistance data is signaled in LPP message (e.g., excluding LPP enhancements such as LPPe). In yet another embodiment, the complementary assistance data comprise the timing information.

According to another embodiment, the UE upon receiving the assistance data with no cell for which the timing information is available in the UE, the UE requests additional assistance data (e.g., via user-plane or control-plane signaling). In still another embodiment, the positioning assistance data (e.g., via LPP or LPPe) may contain the information facilitating accessing the timing information by the UE, e.g., the channel information over which the timing information may be transmitted and which may be read by the UE.

The techniques described above can be used to provide several advantages. For instance, using these techniques, positioning test cases may be designed that account for the necessity of acquiring the timing information. Additionally, the use of these techniques may ensure that the UE reports the positioning measurements to the network within the expected time in accordance with the performance required (e.g., fulfilling RSTD measurement reporting delay requirement and/or fulfilling RSTD measurement accuracy requirement). Similarly, these techniques may ensure that UEs that are compliant to the standardized performance requirements don't fail the test, and may prevent the network node from resending the assistance data or report/declare positioning session failure. This is because without considering the cell timing acquisition time the network node may expect that UE reports to be received much earlier than the actual time. Finally, these techniques may be used to provide the UE with the timing information or the information that facilitates the acquiring the timing information.

Figure 8:
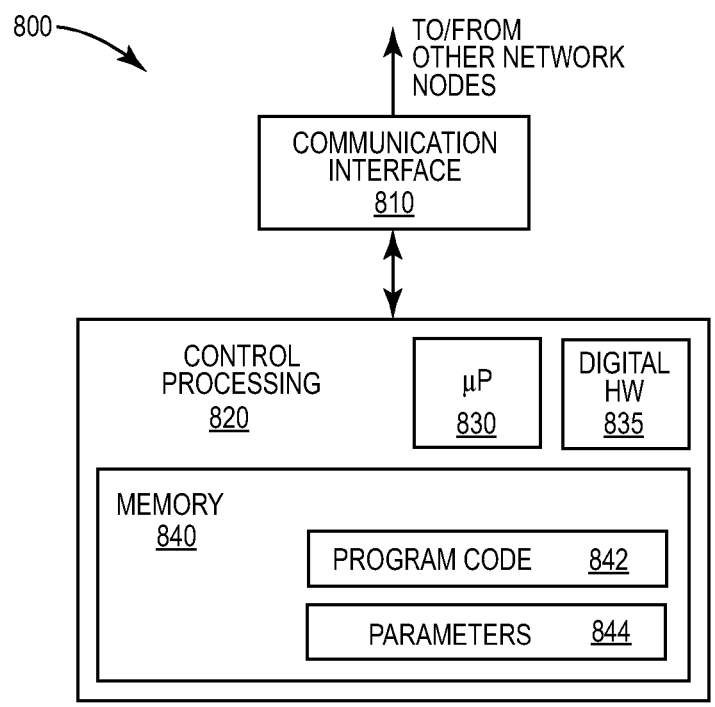
FIG. 8 is a block diagram illustrating components of an example network node.

Several of the techniques described above are implemented in connection with positioning-related nodes in a wireless network, such as any of the several positioning nodes illustrated in FIG. 1. FIG. 8 is a block diagram of a positioning node 800, illustrating a few of the components relevant to the present techniques. Positioning node 800 may correspond to an E-SMLC 150 or to an SLP 160, for example, or other positioning node. The pictured apparatus includes communications interface circuit 810, for communicating with other nodes in the fixed and wireless networks, and control processing circuit 820. Communications interface circuit 810 includes digital receiver and transmitter devices that use known communications components and techniques, typically according to a particular telecommunications standard such as the 3GPP standards that define inter-node communications for LTE and/or LTE-Advanced nodes. Because the various details and engineering tradeoffs associated with the design and implementation of such circuitry are well known and are unnecessary to a full understanding of the invention, additional details are not shown here.

Control processing circuit 820 includes one or more microprocessors or microcontrollers 830, as well as other digital hardware 835, which may include digital signal processors (DSPs), special-purpose digital logic, and the like. Either or both of microprocessor(s) 830 and digital hardware 835 may be configured to execute program code 844, which is stored in memory 840 along with positioning parameters 944. Again, because the various details and engineering tradeoffs associated with the general design of control processing circuitry for network nodes are well known and are unnecessary to a full understanding of the invention, additional details are not shown here.

The program code 844 stored in memory circuit 840, which may comprise one or several types of memory such as read-only memory (ROM), random-access memory, cache memory, flash memory devices, optical storage devices, etc., includes program instructions for executing one or more telecommunications and/or data communications protocols, such as the LPP, LPPe and/or SUPL protocols discussed above, as well as instructions for carrying out one or more of the techniques described above. Positioning parameters 844 include various pre-determined configuration parameters, such as one or more of the thresholds discussed earlier, and may also include measurement reports and/or measurement report histories from one or more mobile terminals, as well as parameters determined from system measurements, such as channel measurements.

Figure 10:
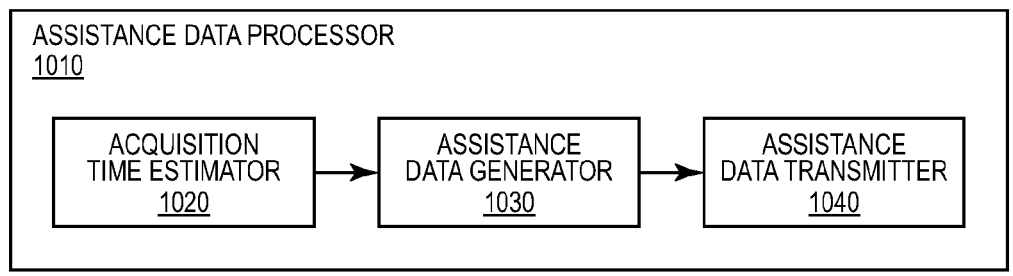
FIG. 10 illustrates an assistance data processor according to some embodiments of the invention.

Accordingly, in various embodiments of the invention, processing circuits, such as the processing circuits 820 of FIG. 8, are configured to carry out one or more of the techniques described above for implementation by a positioning node. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module. Thus, FIG. 10 presents a more generalized view of an assistance data processor 1010 configured to carry out one or several of the techniques described herein. This assistance data processor 1010 may have a physical configuration that corresponds directly to processing circuits 830, for example, or may be embodied in two or more modules or units. In any case, however, assistance data processor 1010 is configured to implement at least three functions, which are pictured in FIG. 10 as acquisition time estimator 1020, assistance data generator 1030, and assistance data transmitter 1040.

Acquisition time estimator 1020 determines an acquisition time for the mobile terminal to obtain timing for at least a first cell to be identified in positioning assistance data for the mobile terminal, using any of the approaches discussed above. Assistance data generator 1030 assembles assistance data that identifies a reference cell and one or more additional neighbor cells to be measured by the mobile terminal, and may in some embodiments also add one or more additional cells to a first set of cells, to ensure that the cells in the assistance data include at least one cell for which the mobile terminal will be able to obtain timing information. Finally, assistance data transmitter 1040 sends the assistance data to the mobile terminal, via an eNodeB or other base station radio transmitter.

Several of the techniques described above can be implemented in connection with a wireless transceiver in a radio access terminal, such as the mobile terminal 110 illustrated in FIG. 1. A radio access terminal, which communicates wirelessly with fixed base stations in the wireless network, can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Figure 9:
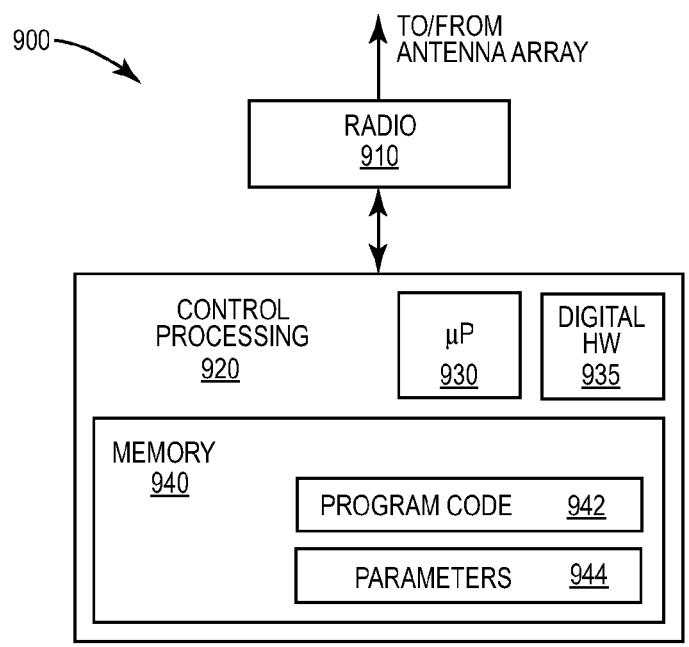
FIG. 9 is a block diagram illustrating components of an example mobile terminal.

FIG. 9 is a block diagram of an example mobile terminal 900, illustrating a few of the components relevant to the present techniques. The pictured apparatus includes radio circuitry 910 and baseband & control processing circuit 920. Radio circuitry 910 includes receiver circuits and transmitter circuits that use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Baseband & control processing circuit 920 includes one or more microprocessors or microcontrollers 930, as well as other digital hardware 935, which may include digital signal processors (DSPs), special-purpose digital logic, and the like. Either or both of microprocessor(s) 930 and digital hardware may be configured to execute program code 942 stored in memory 940, along with radio parameters 944. Again, because the various details and engineering tradeoffs associated with the design of baseband processing circuitry for mobile devices and wireless base stations are well known and are unnecessary to a full understanding of the invention, additional details are not shown here The program code 942 stored in memory circuit 940, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 944 include various pre-determined configuration parameters as well as parameters determined from system measurements, such as channel measurements, and include timing information for at least a serving cell and possible one or more additional cells.

Accordingly, in various embodiments of the invention, processing circuits, such as the baseband & control processing circuits 920 of FIG. 9, are configured to carry out one or more of the techniques described above as suitable for implementation by a mobile terminal. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method for positioning a wireless communication node, the method comprising:
    determining an acquisition time ΔT for the wireless communication node to obtain timing for at least a first cell to be identified in positioning assistance data that is to be transmitted to the wireless communication node for assisting that node in performing positioning measurements; and
    transmitting the positioning assistance data to the wireless communication node at least ΔT before an expected time for the wireless communication node to begin performing positioning measurements, the assistance data identifying the first cell and one or more additional cells for measurement by the wireless communication node, wherein a serving cell is included in the positioning assistance data responsive to determining that the acquisition time ΔT is greater than an acquisition time threshold.

2. The method of claim 1, further comprising, after transmitting the positioning assistance data, waiting for a response from the wireless communication node for a time period at least equal to an expected reporting delay that accounts for the acquisition time ΔT, before performing any of the following: resending the assistance data, reporting positioning session failure, and reporting a positioning test failure.

3. The method of claim 1, wherein said determining the acquisition time ΔT is in response to determining whether the wireless communication node is required to obtain timing information for at least one cell prior to performing positioning measurements for cells to be identified in the assistance data.

4. The method of claim 3, wherein determining whether the wireless communication node is required to obtain timing information for at least one cell is based on evaluating previously reported measurements received from the wireless communication node.

5. The method of claim 4, wherein evaluating previously reported measurements comprises determining whether cells to be identified in the assistance data have been measured by the wireless communication node in a given measurement interval.

6. The method of claim 1, wherein the acquisition time ΔT also includes the time for the wireless communication node to acquire a system frame number of the first cell.

7. The method of claim 1, wherein the acquisition time ΔT also includes processing time for the wireless communication node to process a message containing assistance data, a margin time, or both.

8. The method of claim 1, wherein the acquisition time ΔT is based on one or more of the following factors: radio propagation conditions; received signal quality for the first cell; whether DRX is in use; a gap pattern density; whether a search is likely to be performed for intra-frequency, inter-frequency intra-band, inter-frequency inter-band, or inter-RAT cells; a number of carriers to be measured; transmitted subframes for which measurements are allowed; and one or more advanced receiver capabilities for the wireless communication node.

9. The method of claim 1, wherein determining the acquisition time ΔT comprises estimating a received signal quality for the first cell or acquiring an estimated received signal quality for the first cell from a database, and comparing the estimated received signal quality to a threshold.

10. The method of claim 1, further comprising including a serving cell in the positioning assistance data responsive to determining that obtaining timing is not possible for an initial set of cells to be included in the positioning assistance data.

11. The method of claim 1, further comprising omitting muting information or cells that have muted signals from the transmitted positioning assistance data responsive to determining that the wireless communication node cannot obtain timing information for a reference cell.

12. A positioning node comprising a control processing circuit, wherein the control processing circuit is configured to:
    determine an acquisition time ΔT for a wireless communication node to obtain timing for at least a first cell to be identified in positioning assistance data that is to be transmitted to the wireless communication node for assisting that node in performing positioning measurements; and
    transmit the positioning assistance data to the wireless communication node at least ΔT before an expected time for the wireless communication node to begin performing positioning measurements, the assistance data identifying the first cell and one or more additional cells for measurement by the wireless communication node,
    wherein the control processing circuit is further configured to include a serving cell in the positioning assistance data responsive to determining that obtaining timing is not possible for an initial set of cells to be included in the positioning assistance data.

13. The positioning node of claim 12, wherein the control processing circuit is further configured, after transmitting the positioning assistance data, to wait for a response from the wireless communication node for a time period at least equal to an expected reporting delay that accounts for the acquisition time ΔT, before performing any of the following: resending the assistance data, reporting positioning session failure, and reporting a positioning test failure.

14. The positioning node of claim 12, wherein the control processing circuit is configured to determine the acquisition time ΔT in response to determining whether the wireless communication node is required to obtain timing information for at least one cell prior to performing positioning measurements for cells to be identified in the assistance data.

15. The positioning node of claim 14, wherein the control processing circuit is configured to determine whether the wireless communication node is required to obtain timing information for at least one cell based on evaluating previously reported measurements received from the wireless communication node.

16. The positioning node of claim 15, wherein the control processing circuit is configured to evaluate previously reported measurements by determining whether cells to be identified in the assistance data have been measured by the wireless communication node in a given measurement interval.

17. The positioning node of claim 12, wherein the acquisition time ΔT also includes the time for the wireless communication node to acquire a system frame number of the first cell.

18. The positioning node of claim 12, wherein the acquisition time ΔT also includes processing time for the wireless communication node to process a message containing assistance data, a margin time, or both.

19. The positioning node of claim 12, wherein the acquisition time ΔT is based on one or more of the following factors: radio propagation conditions; received signal quality for the first cell; whether DRX is in use; a gap pattern density; whether a search is likely to be performed for intra-frequency, inter-frequency intra-band, inter-frequency inter-band, or inter-RAT cells; a number of carriers to be measured; transmitted subframes for which measurements are allowed; and one or more advanced receiver capabilities for the wireless communication node.

20. The positioning node of claim 12, wherein the control processing circuit is configured to determine the acquisition time ΔT by estimating a received signal quality for the first cell or acquiring an estimated received signal quality for the first cell from a database, and comparing the estimated received signal quality to a threshold.

21. The positioning node of claim 12, wherein the control processing circuit is further configured to include a serving cell in the positioning assistance data responsive to determining that the acquisition time ΔT is greater than an acquisition time threshold.

22. The positioning node of claim 12, wherein the control processing circuit is further configured to omit muting information or cells that have muted signals from the transmitted positioning assistance data responsive to determining that the wireless communication node cannot obtain timing information for a reference cell.

23. An assistance data processor comprising:
an acquisition time estimator adapted to determine an acquisition time ΔT for a wireless communication node to obtain timing for at least a first cell to be identified in positioning assistance data for the wireless communication node;
an assistance data generator adapted to form assistance data to be transmitted to the wireless communication node, the assistance data identifying the first cell and one or more additional cells for measurement by the wireless communication node; and
an assistance data transmitter adapted to transmit the positioning assistance data to the wireless communication node at least ΔT before an expected time for the wireless communication node to begin performing positioning measurements,
wherein a serving cell is included in the positioning assistance data responsive to determining that the acquisition time ΔT is greater than an acquisition time threshold.

24. A wireless communication node comprising a control processing circuit, wherein the control processing circuit is configured to:
receive positioning assistance data for assisting the node in performing positioning measurements, wherein the positioning assistance data is received at least an acquisition time ΔT before an expected time for the wireless communication node to begin performing positioning measurements, and wherein the acquisition time ΔT is time for the wireless communication node to obtain timing for at least a first cell to be identified in positioning assistance data;
identify timing information within the received positioning assistance data that pertains to the first cell included in the positioning assistance data; and
perform positioning measurements with respect to the first cell based on the identified timing information,
wherein muting information or cells that have muted signals are omitted from the positioning assistance data in an event the wireless communication node cannot obtain timing information for a reference cell.

* * * * *